2 Sheets--Sheet 1.
W. E. FISCHER.
Hand-Nailers for Lasting Boots and Shoes.
No. 5,475. Reissued July 1, 1873.
A.
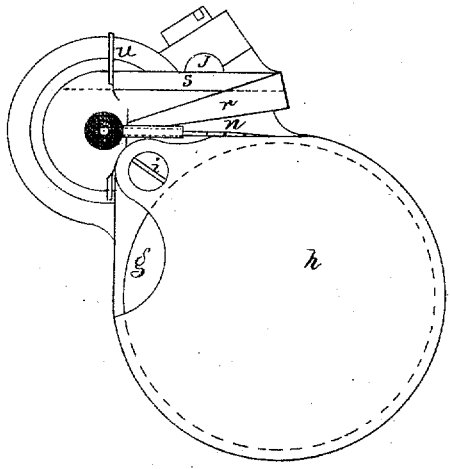
D.
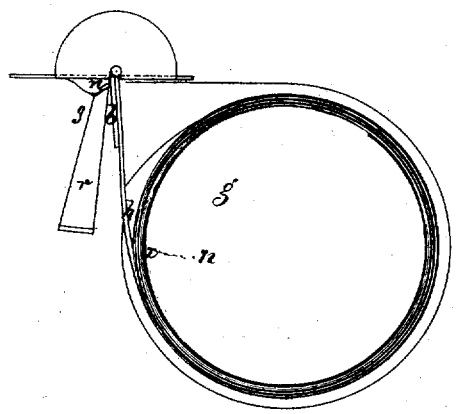
Witnesses.
M. W. Frothingham.
L. H. Latimer.
Inventor.
William E. Fischer,
By his Attys.
Crosby & Gould
AM. PHOTO-LITHOGRAPHIC CO. N.Y. (OSBORNE'S PROCESS.)

2 Sheets--Sheet 2.
W. E. FISCHER.
Hand-Nailers for Lasting Boots and Shoes.
No. 5,475. Reissued July 1, 1873.
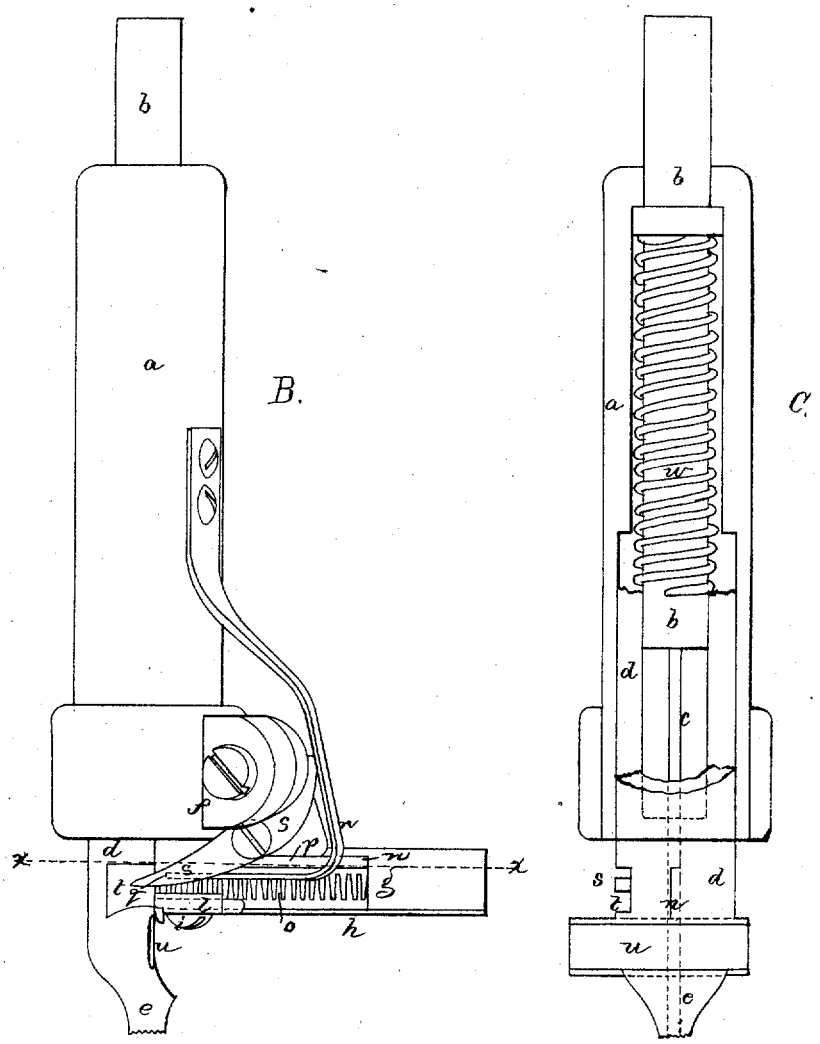
Witnesses
M. W. Frothingham.
S. H. Latimer.
Inventor
William E. Fischer.
By his Attys.
Crosby & Gould
AM. PHOTO-LITHOGRAPHIC CO. N.Y. (OSBORNE'S PROCESS.)

UNITED STATES PATENT OFFICE.

WILLIAM E. FISCHER, OF BOSTON, ASSIGNOR, BY MESNE ASSIGNMENTS, TO CHARLES H. TRASK, OF LYNN, AND FRANCIS GOULD, OF BOSTON, MASSACHUSETTS.

IMPROVEMENT IN HAND-NAILERS FOR LASTING BOOTS AND SHOES.

Specification forming part of Letters Patent No. 90,650, dated June 1, 1869; reissue No. 5,475, dated July 1, 1873; application filed June 14, 1873.

*To all whom it may concern:*

Be it known that I, WILLIAM E. FISCHER, of Boston, in the county of Suffolk and State of Massachusetts, have invented an Improved Hand-Nailer for Lasting Boots and Shoes; and I do hereby declare that the following, taken in connection with the drawings which accompany and form part of this specification, is a description of my invention sufficient to enable those skilled in the art to practice it.

The invention relates to cutting and driving lasting-nails in lasting the uppers of boots and shoes to their inner soles preparatory to securing the outer sole to the vamp and inner sole.

Hand-peggers have been made, to some extent, in which, by the blow of the piston or driver, a peg was cut from a strip of peg-wood, and was driven by the same blow, and there have been of late devised hand-nailers, in which, from a band or ribbon of metal, a nail is cut and driven at each blow of the piston or driver. It will be seen, therefore, that my invention is not, broadly, in a mechanism so organized as to automatically cut a fastening device from a blank and drive it by or at each descent of the driver. In my invention I use a peculiar nail-forming blank, and it is in such blank and in the organization that feeds this blank into position for the action of the cutter, in the method of operation of the cutter, and in the arrangement of the driver that my invention consists.

The drawing represents a nailer and nail-blank embodying the invention. A shows the same in bottom view. B is an elevation of it. C is a vertical central section of it, but showing the driver in elevation. D is a section on the line *x x*.

*a* denotes a tube or cylinder, in which reciprocates a plunger or piston, *b*, at the bottom of which is a driver, *c*, which works through the bore of a nail-tube, *d*, this tube also sliding in the tube or cylinder *a*, the point or nose *e* of the nail-tube being pressed against the edge to be nailed. On one side of the tube or cylinder *a* and fixed to the cylinder by a clamp or coupling, *f*, is a box, *g*, for containing the coil, ribbon, or blank, from which the nails are to be cut, this box having a swinging gate or plate, *h*, which forms the bottom thereof, but which, by being swung around upon the pin *i*, opens the box for introduction of the blank. On one side of the box is an opening, *k*, through which the end of the blank passes, or is led from the box between the lips of a guide, *l*, and through a slit, *m*, into the nail-tube. The nail-blank *n* is formed something like a comb—that is to say, it is composed of a series of tapering teeth, *o*, united of a top piece, *p*, as seen at B—each tooth being the shank of a nail, the head of which is formed of the part to be cut off with the shank. The blank is then fed by the point or tooth *q* of a spring or spring-pawl, *r*, which being fastened at its upper end to the cylinder *a*, extends down therefrom and is bent around and has its point lying or pressing against the blank. The feed-spring is pressed outward by the action of one arm of a lever, *s*, whose other arm extends into a slot, *t*, in the shank of the nose-piece or nail-tube *d*. When the cylinder *a* is pressed down the lever throws out the spring *r* and draws back the blank, while, when the cylinder is thrown up, the spring is released from the lever, and by its recoil thrusts the end of the blank forward through the slit and into the nail-tube. Just below this slit a cutter, *u*, is fixed on one side of the nail-tube, which is cut away, the upper or cutting edge of the cutter lying in the plane of one side of the nail-tube bore, so that as the cylinder is pressed down the cutter enters between the tooth forced into the nail-tube and the next adjacent tooth. The descent of the cylinder forces the cutter against the band of union at the top of the teeth, and severs the end nail from the blank, the separated nail being thus left in the tube and being driven by the descent of the driver upon it, the descent of the cylinder to cut off the nail, and the blow of the driver to drive the severed nail, being effected by one blow of the hand or of a hammer upon the top of the piston *b*. The cylinder in descending first brings the cutter between the end nail or tooth and the next one thereto, and then forces the lever *s* against the feed spring or pawl, carrying back the pawl-tooth; and, as the cutter is between the teeth of the blank, the blank is thereby held stationary, while the pawl-tooth slips back, the pawl-tooth thus coming into position against the blank to again feed the blank at its next forward movement. The cylinder *a* and the driver-piston *b* are both held up or in their respective normal positions by the stress of a spring, *w*, the upper end of which bears against a flange on the piston, and its lower end against the top of the nail-driver tube, as seen at C. The cutter *u* is made a little tapering, and with its opposite edges dovetailing, and it sets in a corresponding tapering and dovetailing groove in the side of the nail-driver tube, and as the cutter-edge becomes dulled the cutter is removed, ground down a little, and again driven into its socket, bringing a new portion of the cutting-edge into position; or the edge of the cutter and the grooves may be made parallel, and the cutter be driven endwise as any acting portion of its cutting-edge becomes dulled by severing the nails.

I claim—

1. The combination of a stationary cutter, a sliding nail-blank holder, and a sliding nail-driver, when arranged to operate substantially as described.

2. A machine for cutting and driving nails, in which the nail-blank is composed of a series of shank-forming teeth, united at top, each tooth being severed from the blank, (to be driven,) substantially as described.

3. The feed-spring or spring-pawl, operating to present the end of the nail-blank to the action of the cutter, substantially as described.

4. The nail-blank, formed of metal, and having a head-forming bar, *p*, from which project the tapering shank-forming teeth *o*.

WM. E. FISCHER.

Witnesses:

EUGENE F. LINCOLN,
WILLIAM STEVENS.